United States Patent [19]
Moriwaki et al.

[11] Patent Number: 5,404,066
[45] Date of Patent: Apr. 4, 1995

[54] FEED SYSTEM

[75] Inventors: Toshimichi Moriwaki, 1-50-301, 6-chome, Nishiochiai, Suma-ku, Kobe-shi, Hyogo-ken; Eiji Shamoto, 5-7-406, 1-chome, Nigawakita, Takarazuka-shi, Hyogo-ken; Akira Tsuboi, Kariya; Yukio Maeda, Chiryu, all of Japan

[73] Assignees: Toyoda Koki Kabushiki Kaisha, Kariya; Toshimichi Moriwaki, Kobe; Eiji Shamoto, Takarazuka, all of Japan

[21] Appl. No.: 130,422

[22] Filed: Oct. 1, 1993

Related U.S. Application Data

[63] Continuation of Ser. No. 901,227, Jun. 19, 1992, abandoned.

[30] Foreign Application Priority Data

Jun. 21, 1991 [JP] Japan .................. 3-149120

[51] Int. Cl.6 .................................... H01L 41/08
[52] U.S. Cl. ..................... 310/328; 310/317
[58] Field of Search ............ 310/323, 328, 317, 316; 318/116

[56] References Cited

U.S. PATENT DOCUMENTS

| | | | |
|---|---|---|---|
| 3,138,749 | 6/1964 | Stibitz | 310/328 X |
| 4,468,583 | 8/1984 | Mori | 310/328 |
| 4,578,607 | 3/1986 | Tojo et al. | 310/328 |
| 4,613,782 | 9/1986 | Mori et al. | 310/323 |
| 4,622,483 | 11/1986 | Staufenberg, Jr. et al. | 310/328 |
| 4,727,278 | 2/1988 | Staufenberg, Jr. et al. | 310/328 |
| 4,874,979 | 10/1989 | Rapp | 310/328 |
| 4,928,030 | 5/1990 | Culp | 310/328 |
| 4,947,077 | 8/1990 | Murata | 310/328 |
| 5,017,820 | 5/1991 | Culp | 310/328 |
| 5,027,027 | 6/1991 | Orbach et al. | 310/317 |
| 5,043,621 | 8/1991 | Culp | 310/316 |
| 5,264,755 | 11/1993 | Hettlage | 310/328 |
| 5,268,621 | 12/1993 | Hamers | 318/116 |

FOREIGN PATENT DOCUMENTS

| | | | |
|---|---|---|---|
| 2562987 | 10/1985 | France . | |
| 3932449 | 4/1990 | Germany . | |
| 0066574 | 4/1986 | Japan | 310/323 |
| 61-146440 | 7/1986 | Japan . | |
| 0248576 | 11/1986 | Japan | 310/328 |
| 0238470 | 9/1989 | Japan | 310/328 |
| 0290170 | 11/1990 | Japan | 310/328 |

*Primary Examiner*—Mark O. Budd
*Attorney, Agent, or Firm*—Oblon, Spivak, McClelland, Maier, & Neustadt

[57] ABSTRACT

Herein disclosed is a feed system which comprises: a moving body; a plurality of sets of support blocks arranged at the two sides of the moving body and along the moving direction of the moving body; a plurality of clamping members supported through elastically deformable members by the respective sets of the support blocks to engage with the sides of the moving body; clamping actuators mounted on the individual sets of the support blocks for displacing the clamping members toward the sides of the moving body to clamp the moving body; moving actuators mounted on the individual sets of the support blocks for displacing the clamping members in the moving direction of the movable member; and control means for operating the clamping actuators and the moving actuators with phases offset from each other.

10 Claims, 8 Drawing Sheets

| PHASE ANGLE | CLAMP VOL. COMMAND |
|---|---|
| 0 | 0 |
| 10 | 5 |
| 20 | 10 |
| ⋮ | ⋮ |
| 130 | 10 |
| ⋮ | ⋮ |
| 250 | 10 |
| 270 | 0 |
| ⋮ | ⋮ |
| 360 | 0 |
| 380 | 10 |
| ⋮ | ⋮ |
| 610 | 10 |
| 630 | 0 |
| ⋮ | ⋮ |
| 720 | 0 |
| 740 | 10 |
| ⋮ | ⋮ |

| PHASE ANGLE | MOVING VOL. COMMAND |
|---|---|
| 0 | 0 |
| 10 | 0.4 |
| ⋮ | ⋮ |
| 130 | 5.0 |
| ⋮ | ⋮ |
| 250 | 9.6 |
| 260 | 10.0 |
| ⋮ | ⋮ |
| 310 | 5.0 |
| ⋮ | ⋮ |
| 360 | 0 |
| ⋮ | ⋮ |
| 490 | 5.0 |
| ⋮ | ⋮ |
| 620 | 10.0 |
| ⋮ | ⋮ |
| 670 | 5.0 |
| ⋮ | ⋮ |

5,404,066

FEED SYSTEM

This application is a Continuation of application Ser. No. 07/901,227, filed on Jun. 19, 1992, now abandoned.

BACKGROUND OF THE INVENTION

1. Field of the Invention

The present invention relates to a feed system and, more particularly, to a feed system capable of carrying a moving body back and forth by using an actuator.

2. Description of the Prior Art

A feed system making use of the electroeletricity of the actuator is exemplified in the prior art by a piezoelectric linear actuator of inch worm type.

FIG. 8 is a section showing a piezoelectric linear actuator of this conventional type. In FIG. 8, reference numerals 1 and 2 designate a stationary support member and a movable support member, respectively, which are juxtaposed at a predetermined Spacing to each other. In these support members 1 and 2, there are fitted bearing cylinders 5 and 6 which are coaxially fastened by fastening screws 3 and 4, respectively. Between the bearing cylinders 5 and 6, there is reciprocally supported a moving body 7 which is to be clamped and unclamped by clamping actuators 8 and 9 fitted in the bearing cylinders 5 and 6, respectively. Moreover, the stationary support member 1 and the movable support member 2 are connected by a moving actuator 10.

In the piezoelectric linear actuator thus constructed, a voltage having a square waveform is intermittently applied at a phase timing, as shown in FIG. 9, to the clamping actuators 8 and 9 and the moving actuator 10. Then, the actuators 8 and 9 are extended and contracted to clamp and unclamp the moving body 7. Simultaneously with this, the actuator 10 is also extended and contracted to carry the moving body 7 intermittently forward or backward.

Since, however, what is effected by such conventional feed system is the intermittent feed, the system can be used merely as positioning means. Thus, there arises a problem that the conventional system cannot be used as a smooth feeder such as a tool feeder in a machine tool.

SUMMARY OF THE INVENTION

The present invention has been conceived in view of that problem and has an object to provide a piezoelectric feed system capable of effecting a smooth continuous feed.

In order to achieve the above-specified object, according to the present invention, there is provided a feed system comprising: a moving body; a plurality of sets of support blocks arranged at the two sides of said moving body and along the moving direction of said moving body; a plurality of clamping members supported through elastically deformable members by the respective sets of said support blocks to engage with the sides of said moving body; clamping actuators mounted on the individual sets of said support blocks for displacing said clamping members toward the sides of said moving body to clamp said moving body; moving actuators mounted on the individual sets of said support blocks for displacing said clamping members in the moving direction of said movable member; and control means for operating said clamping actuators and said moving actuators with phases offset from each other.

With this structure, commands according to phase angles fed from the control means are fed to the clamping actuator and the moving actuator in each set of the support block. As a result, the clamping members are displaced to clamp and unclamp the moving body and are displaced in the moving direction of the moving body so that the moving body is moved smoothly and continuously.

BRIEF DESCRIPTION OF THE DRAWINGS

Other objects, features and advantages of the present invention will become apparent from the following description to be made with reference to the accompanying drawings, in which.

DESCRIPTION OF THE PREFERRED EMBODIMENT

One embodiment of the present invention will be described in the following with reference to FIGS. 1 to 7.

Figure 1:
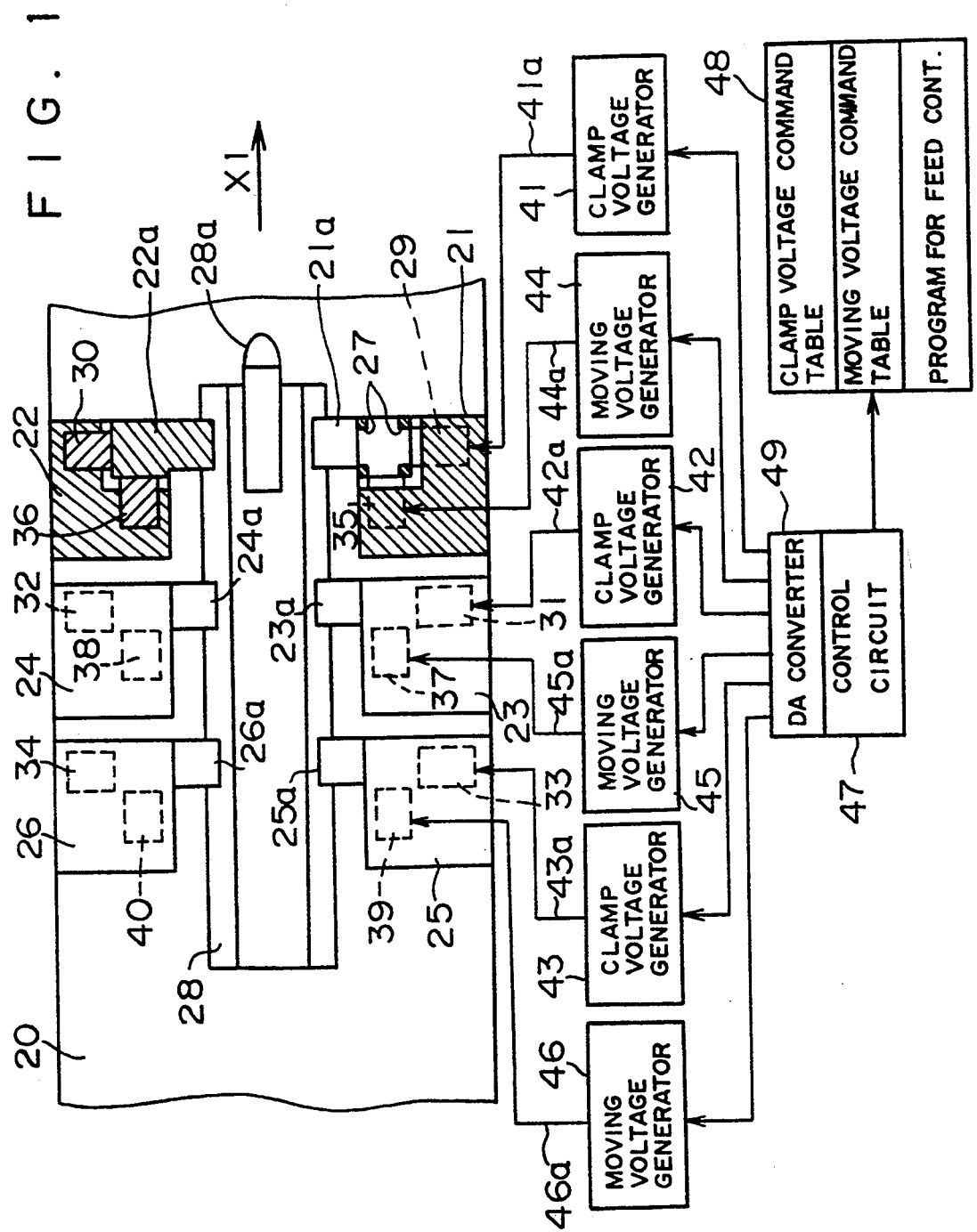
FIG. 1 is a top plan view showing the state, in which a control unit is added to a feed system according to one embodiment of the present invention.
Figure 2:
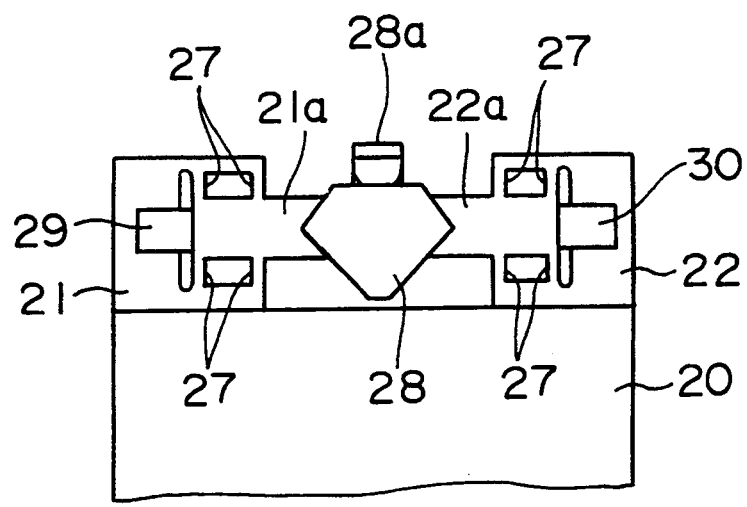
FIG. 2 is a side elevation showing the feed system of the present embodiment.
Figure 3:
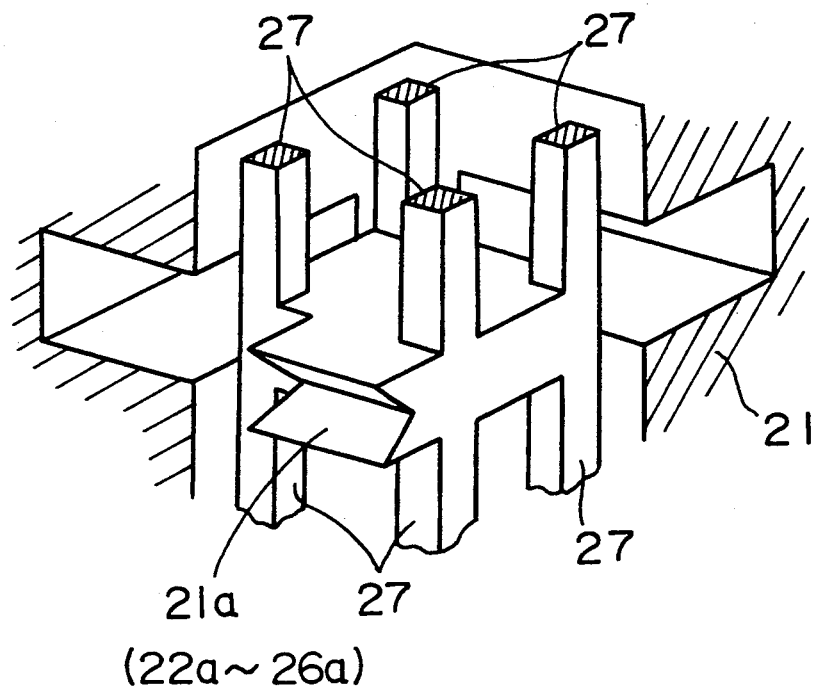
FIG. 3 is a partially cut-away perspective view showing a support block in the present embodiment.
Figure 4:
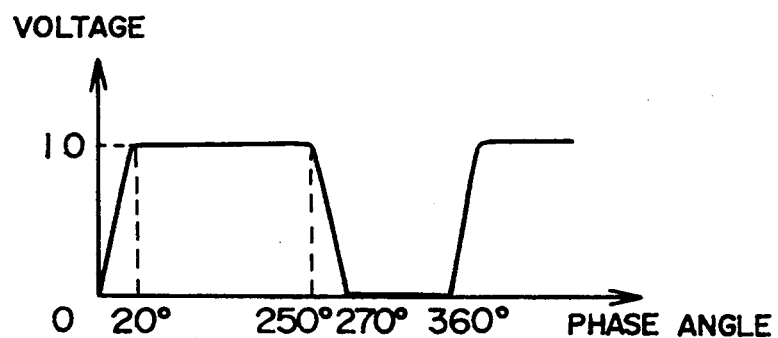
FIG. 4(a) is an explanatory diagram showing one example of a clamp voltage command table in the present embodiment.
FIG. 4(b) is a graph plotting the data of the clamp voltage command table.
Figure 5:
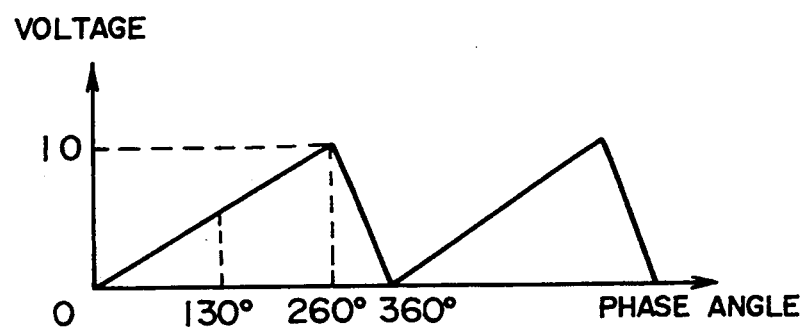
FIG. 5(a) is an explanatory diagram showing one example of a moving voltage command table in the present embodiment.
FIG. 5(b) is a graph plotting the data of the moving voltage command table.

FIG. 1 is a partially cut-away top plan view showing the whole structure which has a control unit attached thereto; FIG. 2 is a side elevation of the same; and FIG. 3 is a partially cut-away perspective view of a support block.

In FIGS. 1 and 2, reference numeral 20 designates a base, on which three sets of support blocks 21 to 26 made of spring steel are juxtaposed to each other at a predetermined spacing transversely of the base 20. Moreover, the support blocks 21 and 22, the support blocks 23 and 24, and the support blocks 25 and 26 belonging to the individual sets are arranged at a predetermined spacing longitudinally of the base 20. Still moreover, the paired support blocks of each set are opposed to each other.

On the other hand, the support blocks 21 to 26 of the individual sets are equipped with body clamping members 21a to 26a which are horizontally protruded at a predetermined height toward the other of the pairing support blocks. These clamping members 21a to 26a are supported, as shown in FIGS. 2 and 3, by a plurality of elastically deformable members 27 (which are designated at a common reference numeral because they have identical structures among the individual support blocks) formed in the corresponding support blocks 21 to 26 by the wire cutting method, such that they can be displaced longitudinally and transversely, i.e., in the moving direction of a moving body 28 and in a direction perpendicular to the former. Specifically, the individual clamping members 21a to 26a have their upper and lower faces connected to the support blocks 21 to 26 through four columns having square sections. These support columns constitute the elastically deformable members 27.

With the individual clamping members 21a, 23a and 25a, and 22a, 24a and 26a thus arranged and spaced in the moving direction of the moving body 28, there are engaged the two side faces of the moving body 28 through dove-tailed grooves such that they are supported to slide in the longitudinal direction. Moreover, a tool 28a is carried by the moving body 28.

In the individual support blocks 21 to 26, there are fitted piezoelectric elements 29 to 34 which act as clamping actuators operated in the direction to move their clamping members 21a to 26a back and forth, i.e., to clamp and unclamp the moving body 28. In the individual support blocks 21 to 26, moreover, there are fitted piezoelectric elements 35 to 49 which act as moving actuators operated in the direction to move their clamping members 21a to 26a to the right and left, as seen from FIG. 1, i.e., to move the moving body 28 back and forth.

A first clamping voltage generating circuit 41 acting as an amplifier is connected with the clamping piezoelectric elements 29 and 30 of the support blocks 21 and 22 of the first set, and a first moving voltage generating circuit 44 acting as an amplifier is connected with the moving piezoelectric elements 35 and 36. A second clamping voltage generating circuit 42 acting as an amplifier is connected with the clamping piezoelectric elements 31 and 32 of the support blocks 23 and 24 of the second set, and a second moving voltage generating circuit 45 acting as an amplifier is connected with the moving piezoelectric elements 37 and 38. A third clamping voltage generating circuit 43 acting as an amplifier is connected with the clamping piezoelectric elements 33 and 34 of the support blocks 25 and 26 of the second set, and a second moving voltage generating circuit 46 acting as an amplifier is connected with the moving piezoelectric elements 39 and 40.

Incidentally, there are omitted from FIG. 1 the wiring lines for connecting the clamp voltage generating circuits 41, 42 and 43 and the clamping piezoelectric elements 30, 32 and 34, and the wiring lines for connecting the moving voltage generating circuits 44, 45 and 46 and the moving piezoelectric elements 36, 38 and 40.

A controls circuit 47 manages and control the entirety and is constructed of a CPU. The control circuit 47 is connected through a DA conversion circuit 49 with the clamp voltage generating circuits 41 to 43 and the moving voltage generating circuits 44 to 46. Clamp voltage command data are outputted from the control circuit 47 and converted by the DA conversion circuit 49 into analog clamp command values, which are fed to the clamp voltage generating circuits 41 to 43. Thus, these clamp voltage generating circuits 41 to 43 output clamp voltages 41a to 43a according to the clamp voltage command values inputted. As a result, the clamping piezoelectric elements 29 to 34 extend or contract in proportion to the magnitudes of the clamp voltages 41a to 43a.

Likewise, moving voltage command data are outputted from the control circuit 47 and converted by the DA converter 49 into analog moving voltage command values, which are fed to the moving voltage generating circuits 44 to 46. Thus, these moving voltage generating circuits 44 to 46 output moving voltages 44a to 46a according to the moving voltage command values inputted. As a result, the moving piezoelectric elements 35 to 40 extend or contract in proportion to the magnitudes of the moving voltages 44a to 46a.

A memory 48 is connected with the control circuit 47 for storing: a clamp voltage command table written with the voltage command data according to phase angles; a moving voltage command table written with the moving voltage command data according to phase angles; and a program for feeding the moving body.

FIG. 4(a) presents one example of the clamp voltage command table for storing the relations between the phase angles and the clamp voltage command values. These data are graphically shown in FIG. 4(b). FIG. 5(a) presents one example of the moving voltage command table for storing the relations between the phase angles and the moving voltage command values. These data are graphically shown in FIG. 5(b).

Next, the operations of the present embodiment thus constructed will be described in the following with reference to the flow charts shown in FIGS. 6(a) and 6(b) and the time chart shown in FIG. 7.

When the electric power is supplied to the feed system, the control circuit 47 is started. At a first step S1, the clamp voltage generating circuit 41 and the moving voltage generating circuit 44 of the first set have their respective output clamp voltage 41a and moving voltage 44a set their initial phase angles TA to TA=0. These initial phase angles TA are stored as the initial value of a later-described control phase angle T1 in the memory 48. At a next step S2, the clamp voltage generating circuit 42 and the moving voltage generating circuit 45 of the second set have their respective output clamp voltage 42a and moving voltage 45a set their initial phase angles TB to TB=120 degrees. These initial phase angles TB are stored as the initial value of a later-described control phase angle T2 in the memory 48. At a next step S3, the clamp voltage generating circuit 43 and the moving voltage generating circuit 46 of the third set have their respective output clamp voltage 43a and moving voltage 46a set their initial phase angles TC to TC=240 degrees. These initial phase angles TC are stored as the initial value of a later-described control phase angle T3 in the memory 48.

At a step S4, the moving voltage commands corresponding to the initial phase angles TA, TB and TC are fetched from the table of FIG. 5(a) and outputted to the moving voltage generating circuits 44 to 46. At a next step S5, moreover, the clamp voltage commands corresponding to the initial phase angles TA, TB and TC are fetched from the table of FIG. 4(a) and outputted to the clamp voltage generating circuits 41 to 43.

When this initial setting operation is ended, the procedure advances to a step S6, at which the movement L and the feed velocity F of the moving body 28 necessary for the feed of the moving body such as the quick feed of a tool according to the working program are fetched from the memory 28.

At a next step S7, the final value N1 of the control counter proportional to the movement L is operated by dividing the fetched command movement L by a unit movement ΔL of the moving body 28. At a next step S8, the count value N of the control counter built up in the memory 48 is reset to 0. Here, the unit movement ΔL is defined as the movement of the moving body 28 when the phases of the clamp voltage and the moving voltage are changed by a predetermined amount (e.g., 10 degrees in the present embodiment).

At a step S9, on the other hand, a velocity coefficient M is operated by dividing the command velocity F by a reference velocity $F_o$. Incidentally, the command velocity $F_o$ is given to have a value of integer times of the reference velocity $F_o$. This reference velocity $F_o$ is the moving velocity of the moving body 28 when the phase angles of the clamp voltage and the moving voltage are changed by a predetermined amount (e.g., 10 degrees) for a predetermined unit time period.

At a next step S10, the new phase angle T1 of the clamp voltage 41a and the moving voltage 44a of the first set is operated. Specifically, the new phase angle T1 is operated by adding the multiplication of the velocity coefficient M and the unit angle (i.e., 10 degrees) to the present phase angle T1. At steps S11 and S12, the new phase angle T2 of the clamp voltage 42a and the moving voltage 45a of the second set and the new phase angle T3 of the clamp voltage 43a and the moving voltage 46a of the third set are operated by similar operations.

At a next step S13, the moving voltage commands corresponding to the phase angles T1, T2 and T3 determined at the steps S10 to S12 are latched by retrieving the table of FIG. 5(a) and are fed to the moving voltage generating circuits 44 to 46. For example, the value "0.4", if the phase angle T1 determined at the steps S10 to S12 is 10 degrees, the value "5.0", if the phase angle T2 is 130 degrees, and the value "9.6", if the phase angle T3 is 250 degrees, are latched from the table and are fed to the moving voltage generating circuits 44 to 46. As a result, the moving voltages 44a to 46a corresponding to those moving voltage command values are generated and applied to the moving piezoelectric elements 35 to 40.

At a next step S14, the clamp voltages commands corresponding to the phase angles T1, T2 and T3 determined at the steps S10 to S12 are likewise latched by by retrieving the table of FIG. 4(a) and are fed to the clamp voltage generating circuits 41 to 43. For example, the value "5.0", if the phase angle T1 determined at the steps S10 to S12 is 10 degrees, and the value "10.0", if the phase angle T2 is 130 degrees, are latched from the table and are fed to the clamp voltage generating circuits 41 to 43. As a result, the clamp voltages 41a to 43a corresponding to those clamp voltage command valves are generated and applied to the clamping piezoelectric elements 29 to 34.

At a next step S15, the counted value of a counter is updated by adding the velocity coefficient M thereto. At a next step S16, it is decided whether or not the counted value N of the counter is equal to or higher than the number N1. Here, if NO, a constant time is awaited at a step S18, and the procedure is returned to the step S10 so that the processings of the step S10 to the step S15 are repeated till N≧N1.

Figure 6:
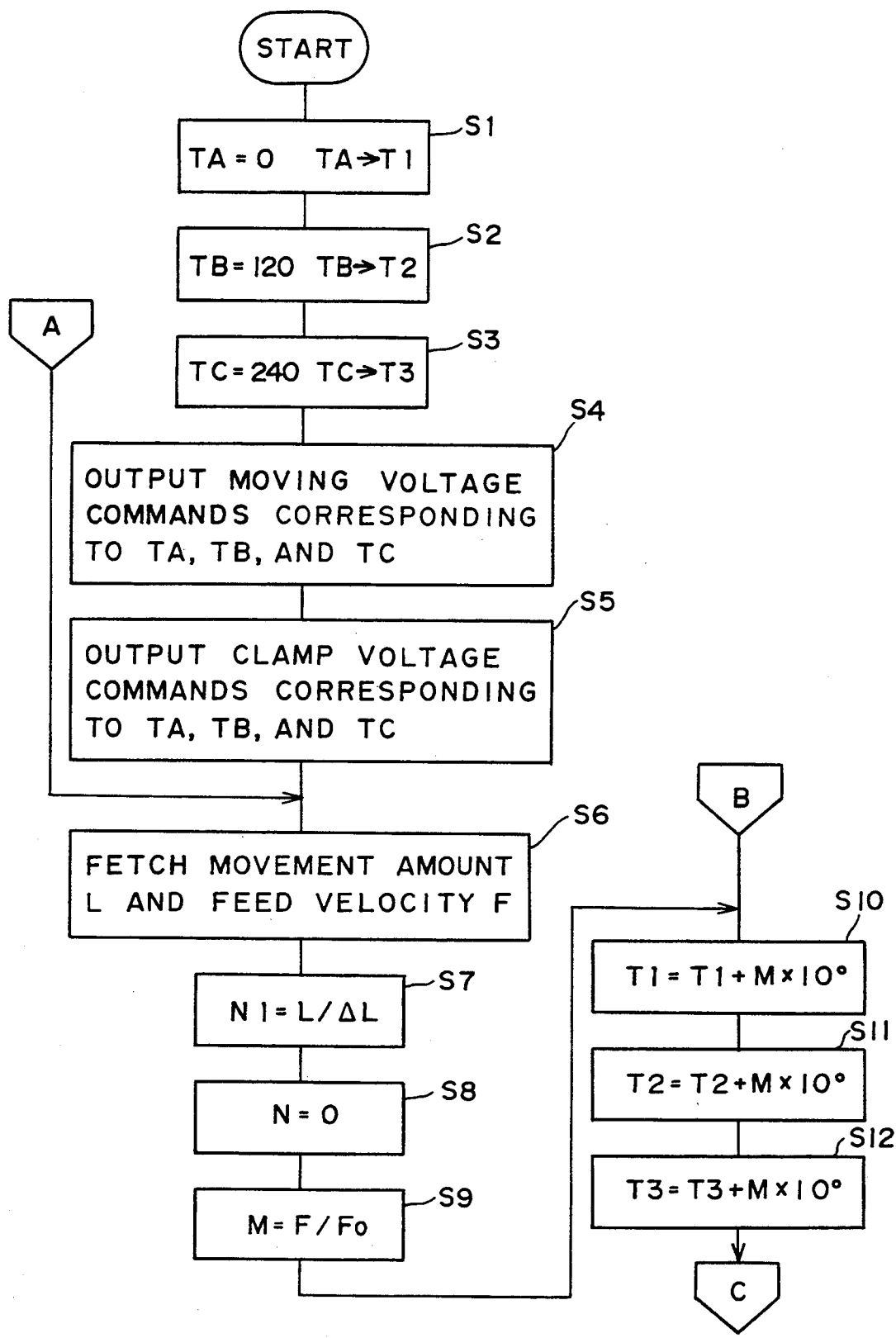
FIGS. 6(a) and 6(b) are flow charts showing a feeding procedure of the present embodiment.
Figure 6:
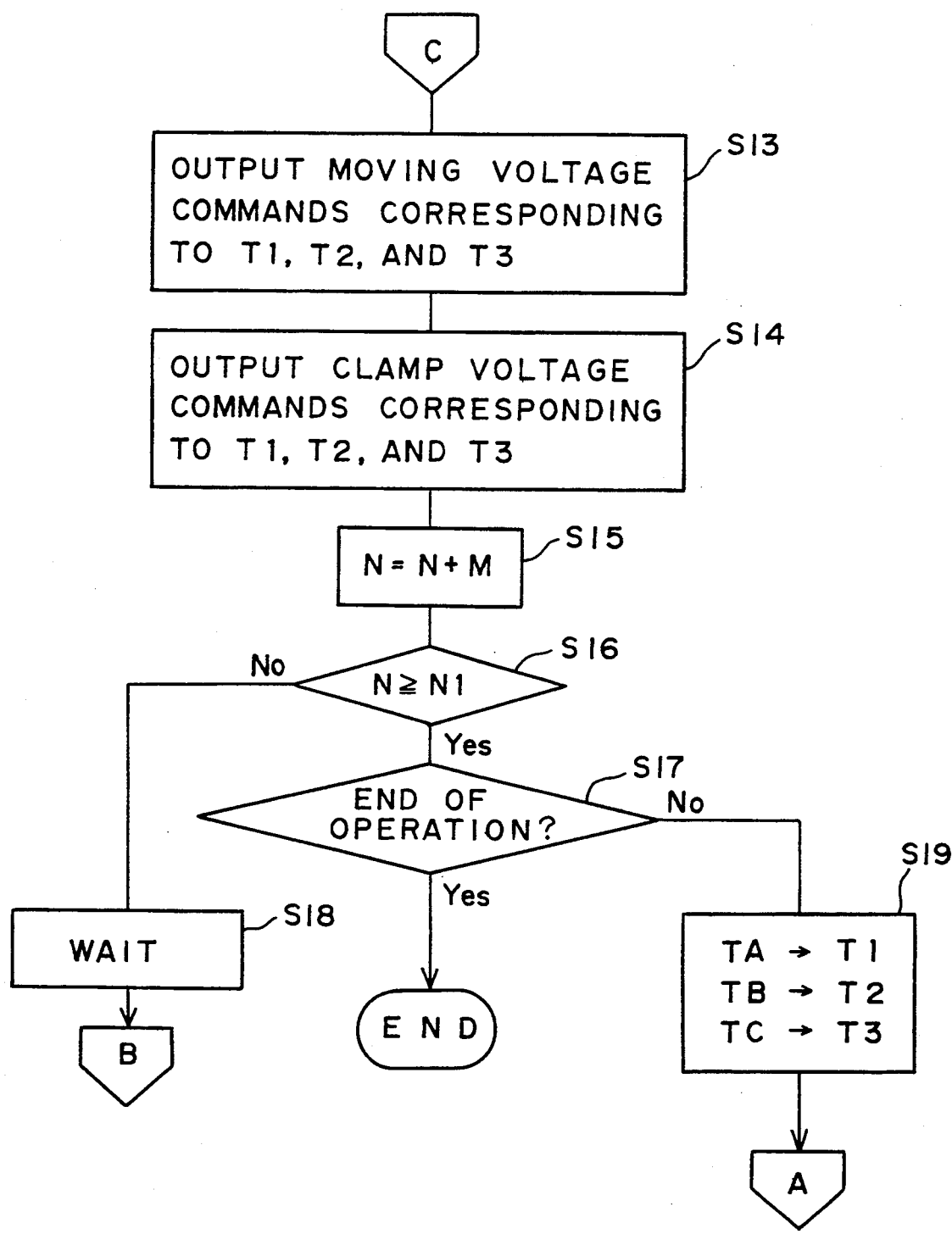

If it is decided at the step S16 that N≧N1, the procedure advances to a step S17, at which it is further decided whether or not the cutting operation according to the working program has been ended. If it is decided here that all the workings for the workpiece have been completed, the feed program of FIG. 6 is ended. If NO at the step S17, on the contrary, the procedure advances to a step S19, at which the phase angles T1, T2 and T3 are set to the initial phase angles TA, TB and TC. Then, the procedure returns to the step S6, at which the processings on and after the step S7 are executed by latching the feed program of a next moving body 28 such as the movement L and the feed velocity F for a precise cutting feed.

Next, the principle for the moving body 28 to be moved by the processings thus far described will be explained with reference to FIG. 7.

Figure 7:
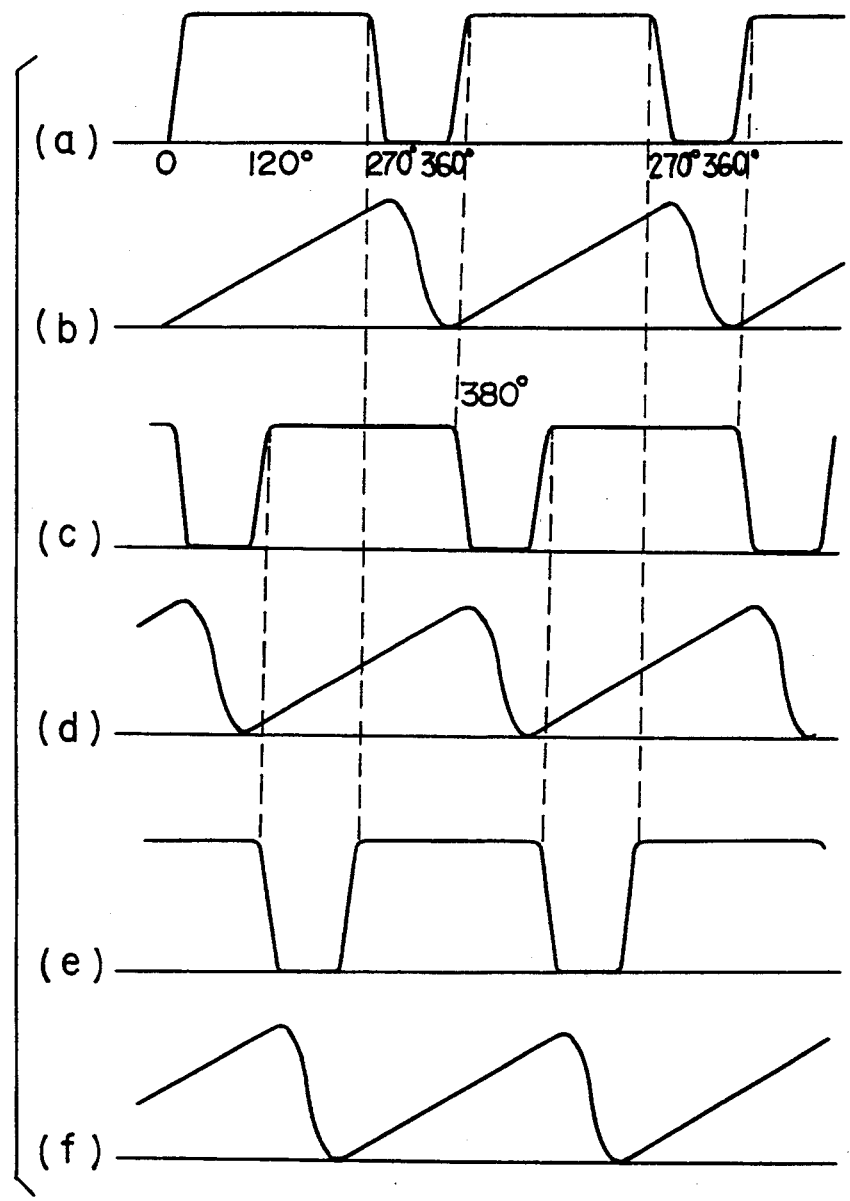
FIG. 7 is a time chart for explaining the operations of the present embodiment.
Figure 8:
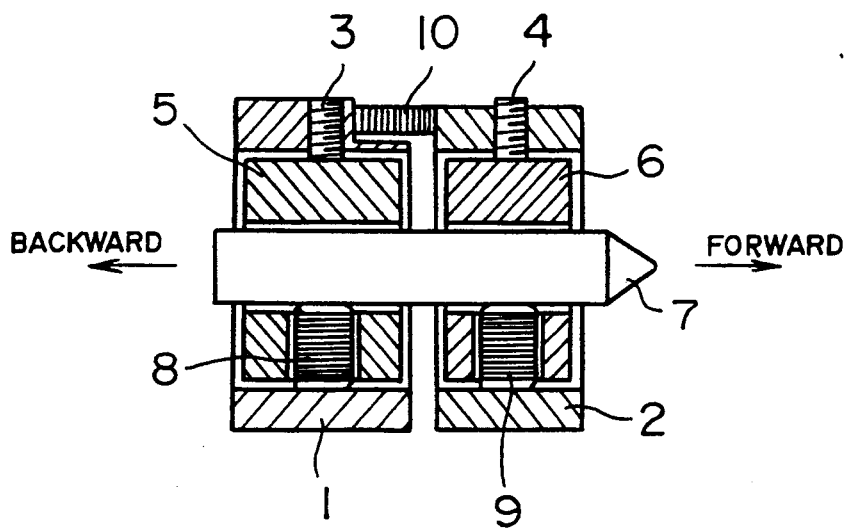
FIG. 8 is a section showing the piezoelectric linear actuator of the prior art.
Figure 9:
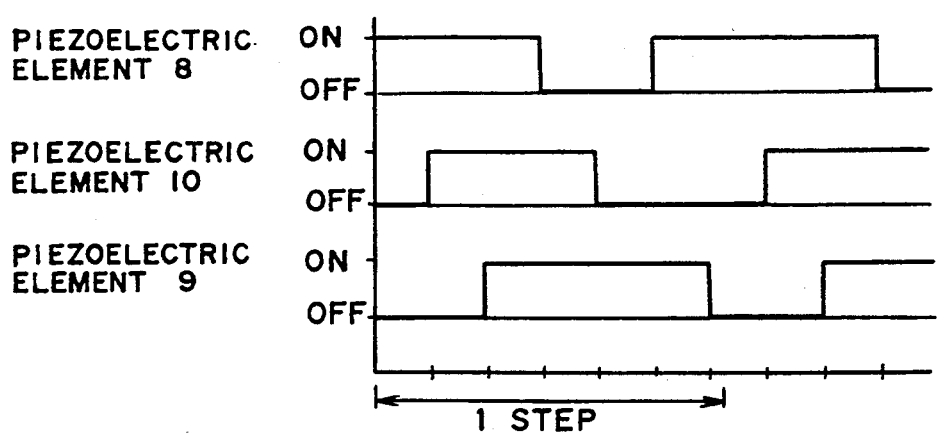
FIG. 9 is a time chart for explaining the operations of the piezoelectric linear actuator of the prior art.

If the three clamp voltage commands corresponding to the phase angles T1, T2 and T3 are fed from the control circuit 47 to the clamp voltage voltage generating circuits 41 to 43, respectively, the clamp voltages 41a to 43a of generally square shapes having a phase difference of 120 degrees, as shown at (a), (c) and (e) in FIG. 7, are sequentially generated from the clamp voltage generating circuits 41 to 43, respectively, and are applied to clamping piezoelectric elements 29 to 34, respectively. Simultaneously with this, if the three moving voltage commands corresponding to the phase angles T1, T2 and T3 are fed from the control circuit 47 to the moving voltage generating circuits 44 to 46, respectively, the moving voltages 44a to 46a of saw-tooth shapes synchronized with the clamp voltages 41a to 43a, as shown at (b), (d) and (f) in FIG. 7, are sequentially generated from the moving voltage generating circuits 44 to 46, respectively, and are applied to the moving piezoelectric elements 35 to 40, respectively.

Specifically, if the clamp voltage 41a of a width of 0 to 270 degrees, in which a voltage level takes the value "10.0" within a phase angle range of 20 to 250 degrees, as shown in FIG. 4(b), is applied at the timing shown at (a) in FIG. 7 to the clamping piezoelectric elements 29 and 30 of the first set, these piezoelectric elements 29 and 30 are piezoelectrically extended to displace the clamping members 21a and 22a toward the moving body 28 thereby to clamp the moving body 28 from the two sides. Simultaneously with this, if the saw-tooth voltage 44a, in which the moving voltage level is linearly changed from "0" to "10.0" within a phase angle range of 0 to 260 degrees, as shown in FIG. 5(b) and in which the voltage level is abruptly changed from "10.0" to "0" within a phase angle range of 260 to 360 degrees, is applied at the timing shown at (b) in FIG. 7 to the moving piezoelectric elements 35 and 36, these piezoelectric elements 35 and 36 are extended in accordance with the saw-tooth voltage waveform to displace the clamping members 21a and 22a in the direction of arrow X1 of FIG. 1. Accordingly, the moving body 28 being clamped is moved in the direction of arrow X1. The movement at this time is at a unit of μm to nm.

When the phase advances by 120 degrees after the clamp voltage 41a and the moving voltage 44a have started to increase from zero, the clamp voltage 42a and the moving voltage 45a for the piezoelectric elements of the second set are generated at the timings shown at (c) and (d) in FIG. 7. When this clamp voltage 42a is applied to the clamping piezoelectric elements 31 and 32, these elements 31 and 32 are piezoelectrically extended to cause the clamping members 23a and 24a to clamp the moving body 28 from the two sides. If, simultaneously with this, the moving voltage 45a is applied to the moving piezoelectric elements 37 and 38, these elements 37 and 38 are piezoelectrically extended to move the moving body 28 further in the direction of arrow X1 while being clamped by the clamping members 23a and 24a. When the clamp voltage 41a for the first set becomes zero at the phase angle of 270 degrees, the piezoelectric elements 29 and 30 are elastically restored by the elastically deforming member 27 to unclamp the moving body 28. Then, the moving voltage 44a is turned off with a delay from the clamp voltage 41a.

Moreover, when the phase advances by 120 degrees after the clamp voltage 42a and the moving voltage 45a have started to increase from zero, the clamp voltage 43a and the moving voltage 46a for the piezoelectric elements of the third set start to increase from zero at the timings shown at (e) and (f) in FIG. 7. When this clamp voltage 43a is applied to the clamping piezoelectric elements 33 and 34, these elements 33 and 34 are piezoelectrically extended to cause the clamping members 25a and 26a to clamp the moving body 28 from the two sides. If, simultaneously with this, the moving voltage 46a is applied to the moving piezoelectric elements 39 and 40, these elements 39 and 40 are piezoelectrically extended to move the moving body 28 further in the direction of arrow X1 while being clamped by the clamping members 25a and 26a. When the clamp voltage 42a for the second set is zero at the phase angle of 380 degrees, the piezoelectric elements 33 and 34 are elastically restored by the elastically deforming member 27 to unclamp the moving body 28. Then, the moving voltage 45a is turned off with a delay from the clamp voltage 42a.

Likewise from now on, the clamp voltage commands and the moving voltage commands are fed out from the control circuit 47 in accordance with the phase angles and are sequentially cyclically applied to the clamp voltage generating circuits and the moving voltage generating circuits of the individual sets. Moreover, the clamp voltages and the moving voltages are accordingly generated at the timings shown in FIG. 7 and are applied to the clamping piezoelectric elements and the moving piezoelectric elements of the individual sets. Then, the moving body 28 can be continuously moved in the direction of arrow X1.

Incidentally, the foregoing embodiment has been described in case the moving body 28 is moved rightward in the direction of the arrow X1 of FIG. 1, but the moving body 28 may be moved leftward. If, in this case, the feed velocity F is negative, the clamping voltages and the moving voltages have their waveforms propagating leftward of FIG. 7, as reversed from the case in which the feed velocity F is positive, so that the moving body 28 can be moved leftward. If the feed velocity F is 0, on the other hand, the voltage waveforms of FIG. 7 propagate neither rightward nor leftward to leave the moving body 28 halted.

Thus, in the present embodiment, the moving body can be moved smoothly and continuously by the piezoelectric elements so that it can be easily used in the tool feed system. Since, moreover, the moving body is always clamped in at least two positions by the clamping portions supported by the columns which are elastically deformed as the piezoelectric elements are extended or contracted, its supporting rigidity is high and stable against the load during the cutting operation. Moreover, a feed of several nanometers can be achieved.

Incidentally, the foregoing embodiment has been exemplified by the system in which the moving body is clamped from the two sides by the three sets of support blocks, but two sets or four or more sets of support blocks may be used. Moreover, the voltage waveforms and the timing control methods of the waveforms of the voltages to be applied to the clamping piezoelectric elements and the moving piezoelectric elements should not be limited to those of the foregoing embodiment. Furthermore, the actuators 29 to 40 should not be limited to the piezoelectric elements but can be exemplified by super-magnetostrictive elements.

As has been described hereinbefore, according to the present invention, the plurality of sets of support blocks are arranged at the two sides of the moving body, and the support blocks of the individual sets are equipped with the moving body clamping members which are supported by elastically deformable members. The support blocks are further equipped with the clamping actuators for displacing the clamping members in the clamping direction and the moving actuators for displacing the clamping members in the moving direction of the moving body. This moving body is moved by those clamping actuators and moving actuators which are controlled by the control means to have different operation phases. Thus, there can be achieved an effect that the feed system can move the moving body smoothly and continuously and can be used as a tool feed.

What is claimed is:

1. A feed system comprising: a moving body; a plurality of sets of support blocks arranged at the two sides of said moving body and along the moving direction of said moving body; a plurality of clamping members supported through elastically deformable members by the respective sets of said support blocks to engage with the sides of said moving body; clamping actuators mounted on the individual sets of said support blocks for displacing said clamping members toward the sides of said moving body to clamp said moving body; moving actuators mounted on the individual sets of said support blocks for displacing said clamping members in the moving direction of said movable member; and control means for operating said clamping actuators with phases offset from each other and for operating said moving actuators with phases offset from each other,
wherein each set of said support blocks includes a first support block disposed at one side of said moving body and a second support block disposed at the other side of said moving body to oppose to said first support block, and wherein said first and second support blocks have their clamping members held at the same height, and
wherein said elastically deformable members for supporting said clamp members include four flexible support columns connecting the upper faces of said clamp members and said support blocks, and four flexible support columns connecting the lower faces of said clamping members and said support blocks.

2. A feed system according to claim 1, wherein said clamping actuators and said moving actuators include piezoelectric elements.

3. A feed system according to claim 2, wherein said control means includes: clamp voltage generating means for generating such a number of clamp voltages having peak values necessary for the clamping actions and their phases shifted sequentially as correspond to that of the sets of said support blocks, so that said clamp voltages may be individually fed to the plurality of sets of the clamping piezoelectric elements mounted in the plurality of sets of said support blocks; and moving voltage generating means for generating such a number of moving voltages individually corresponding to the plurality of said clamp voltages and having their magnitudes continuously varied while said clamp voltages keep their individual peak values as is equal to that of said clamp voltages, so that said moving voltages may be individually fed to the plurality of sets of the moving piezoelectric elements mounted in the plurality of sets of said support blocks.

4. A feed system comprising: a moving body; at least three sets of support blocks arranged at the two sides of said moving body and along the moving direction of said moving body; at least three sets of clamping members supported through elastically deformable members by the respective sets of said support blocks to engage with the sides of said moving body., said clamping members and the sides of said moving body being so formed as to cooperate when engaged for preventing said moving body from being displaced within a plane perpendicular to said moving direction; clamping actuators mounted on the individual sets of said support blocks for displacing said clamping members toward the sides of said moving body to clamp said moving body; moving actuators mounted on the individual sets of said support blocks for displacing said clamping members in the moving direction of said moving body; and control means for operating said clamping actuators with phases offset from each other and for operating said moving actuators with phases offset from each other so that said moving body is continuously fed forward in said moving direction during which time at least two sets of said clamping members feeding said moving body forward clamp and support the moving body, while at least one set of said clamping members moving backward release said moving body.

5. A continuous feed system comprising:
a moving body elongated in its moving direction;
a plurality of sets of support blocks arranged at the two sides of said moving body and along the moving direction of said moving body;
a plurality of clamping members supported through elastically deformable members by the respective sets of said support blocks to engage with the sides of said moving body, said clamping members and the sides of said moving body being so formed as to cooperate when engaged for preventing said moving body from being displaced within a plane perpendicular to said moving direction of said moving body;
clamping piezoelectric elements mounted on the individual sets of said support blocks for displacing said clamping members toward the sides of said moving body to clamp said moving body;
moving piezoelectric elements mounted on the individual sets of said support blocks for displacing said clamping members in the moving direction of said moving body; and
control means for operating said clamping piezoelectric elements with phases offset from each other and for operating said moving piezoelectric elements with phases offset from, and overlapping, each other,
wherein said control means includes: clamp voltage generating means for generating such a number of clamp voltages having peak values necessary for the clamping actions and their phases shifted sequentially as correspond to that of the set of said support blocks, so that said clamp voltages may be individually fed to the plurality of sets of the clamping piezoelectric elements in such a manner that at any time during feed movement, said moving body is clamped and supported by said clamping members on at least two sets of said support blocks while being released from said clamping members on at least the remaining one set of said support blocks; and moving voltage generating means for generating such a number of moving voltages individually corresponding to the plurality of said clamp voltages and having their magnitudes continuously varied while said clamp voltages keep their individual peak values as is equal to that of said clamp voltages, so that said moving voltages may be individually fed to the plurality of sets of the moving piezoelectric elements in such a manner that said clamping members on said at least two sets of said support blocks are moved forward when said clamping members on said remaining one set of said support blocks are moved backward.

6. A feed system according to claim 5, wherein said plurality of sets of support blocks comprise three sets of support blocks.

7. A continuous feed system comprising:
a base;
a moving body movable relative to said base and elongated in a first direction in which said moving body is movable;
three pairs of actuator units arranged on said base in said first direction, with said actuator units of each pair being respectively arranged at the two sides of the moving body in a second direction perpendicular to said first direction, each of said actuator units including:
a) a support block provided bodily with said base at each of the two sides of said moving body,
b) a clamping member provided on said support block,
c) elastically deformable supporting means connecting said clamping member with said support block for enabling said clamping member to be displaceable relative to said support block in said first and second directions,
d) a clamping actuator provided on said support block for moving said clamping member in said second direction so as to clamp said moving body in cooperation with another clamping member of the paired actuator unit opposite thereto in such a manner as to prevent said moving body from being displaced within a plane including said second direction, and
e) a moving actuator of a predetermined feed stroke provided on said support block for displacing said clamping member in said first direction; and
control means for operating all of said clamping and moving actuators of each pair of said actuator units at substantially the same time intervals, but at a different timing shifted from the operations of said clamping and moving actuators of any other pair of said actuator units so that said moving body is continuously fed forward in said first direction during which time said clamping members moving forward of any two pairs of said actuator units clamp and support said moving body at two positions spaced apart in said first direction while said clamping members moving backward of the remaining one pair of said actuator units release said moving body.

8. A continuous feed system according to claim 7, wherein:
said moving body is adapted to mount a cutting tool on one end portion thereof in said first direction.

9. A continuous feed system according to claim 8, wherein:
each of said moving actuators comprises a piezoelectric element which, when operated, alternately performs expansion and contraction motions; and
said control means is designed so that said moving actuators of only one pair of said actuator units simultaneously perform the contraction motion during which time said moving actuators of the remaining two pairs of said actuator units simultaneously perform the expansion motion.

10. A feed system according to claim 8, wherein:
said moving body is formed with corner portions extending in said first direction at the two ends thereof in said second direction, said corner portions representing in cross-section a pair of apexes which are spaced apart in said second direction; and
said clamping member takes at its engaging portion a concave shape to fit a corresponding one of said corner portions of said moving body so that said moving body, when clamped by said clamping members of any two pairs of said actuator units, is unmovable in said plane including said second direction.

* * * * *